United States Patent Office 3,458,790
Patented July 29, 1969

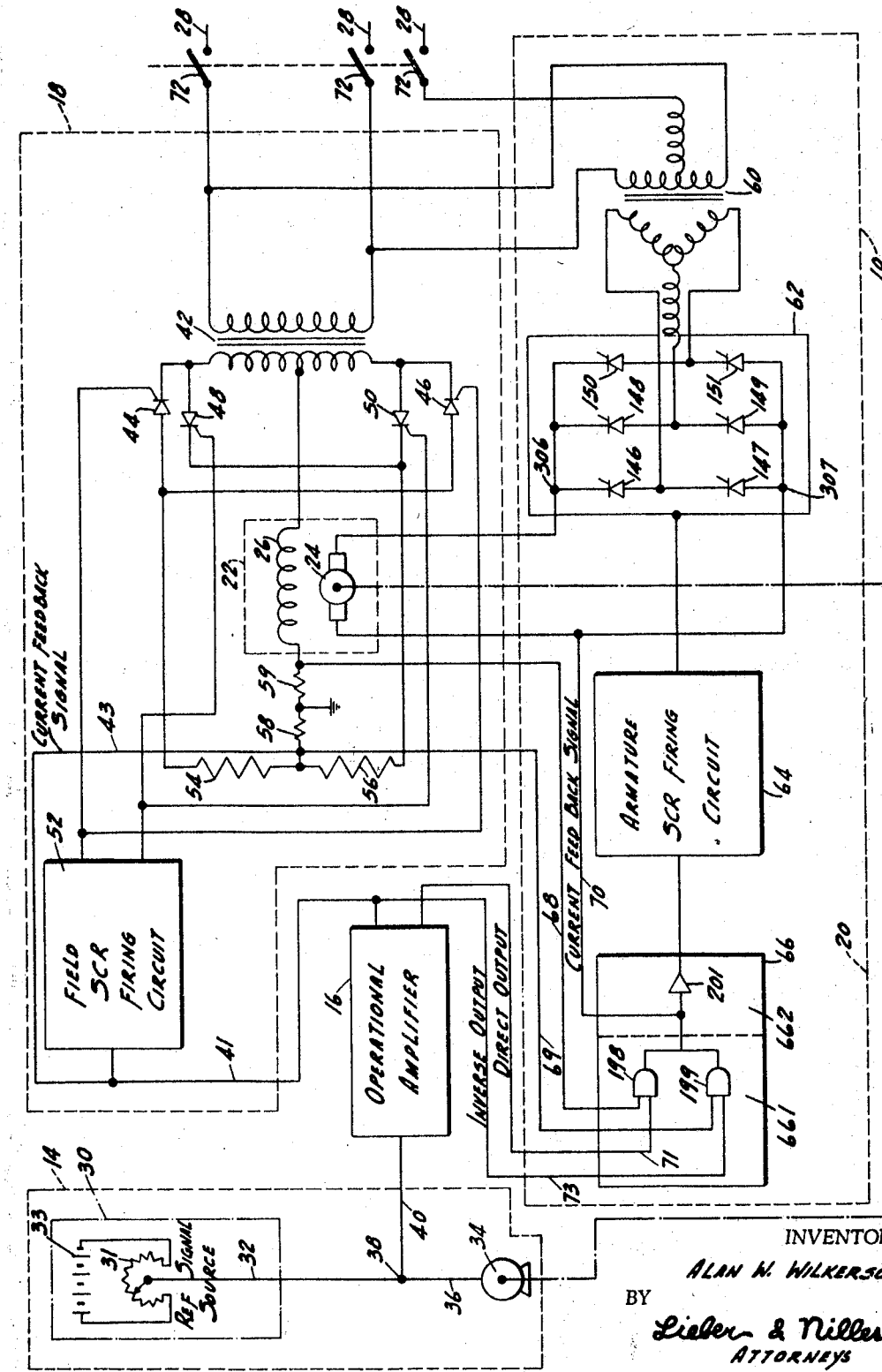

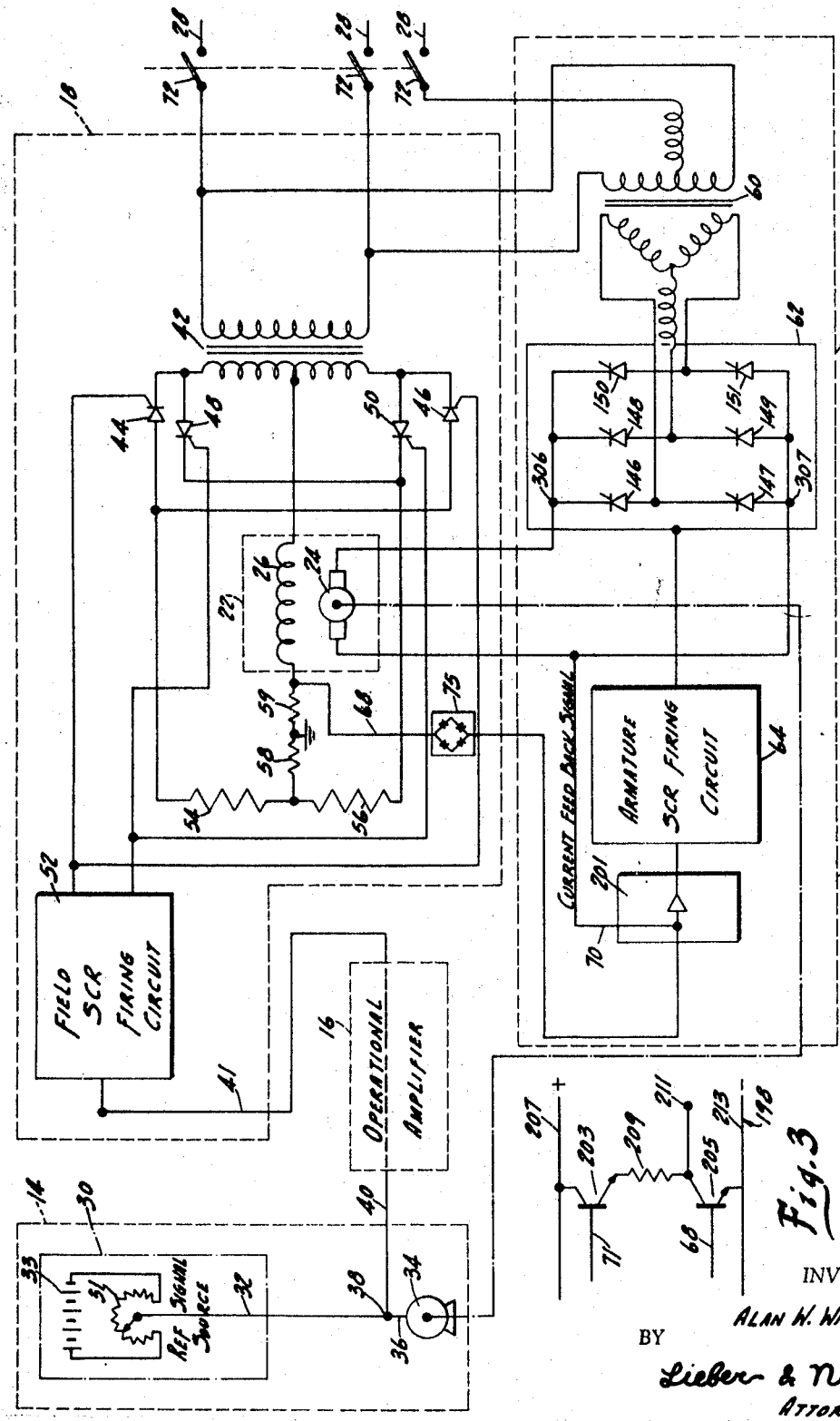

3,458,790
REGENERATIVE DIRECT CURRENT MOTOR CONTROL HAVING FIELD AND ARMATURE CONTROL
Alan W. Wilkerson, Thiensville, Wis., assignor to Web Press Engineering, Inc., Addison, Ill., a corporation of Illinois
Filed Aug. 31, 1966, Ser. No. 576,418
Int. Cl. H02p 1/22, 1/40, 3/20
U.S. Cl. 318—258                                     9 Claims

ABSTRACT OF THE DISCLOSURE

A direct current motor control energizes a direct current motor with proportionate field and armature current energization so as to cause the motor to exhibit the operational characteristics of a direct current series motor. The control also regenerates power from the motor armature to an alternating current power supply during braking by reversing the voltage applied to the armature while maintaining the direction of armature current flow constant. Reversal of the applied armature voltage is obtained by reversing the motor field.

---

The present invention relates to controls for direct current motors and more particularly to a regenerative direct current motor control which energizes the motor so that the motor armature current and motor field current are proportional in magnitude. The control thus provides a direct current motor having the operational characteristics of a series connected direct current motor while at the same time provides regenerative braking to the motor.

A series connected direct current motor, as the name implies, is one in which the motor armature winding and the motor field winding are connected in series so that the same current flows in series through both of them. The operational characteristic of such a motor is one of variable speed operation since, as the motor load increases, the motor speed decreases so as to decrease the counter e.m.f. and allow the motor current to increase to supply the greater torque needed. A series connected direct current motor therefore runs very slowly with heavy loads and very rapidly with light loads.

The torque developed by a direct current motor is proportional to both the armature current and the field strength. In a series connected direct current motor the field strength itself depends on the armature current since the two are connected in series. Thus, the amount or torque developed by the motor depends doubly on the amount of armature current flowing through it. When the motor speed is low, the counter e.m.f. is, of course, low and the armature current is high. The torque of the motor will, therefore, be very high at low or zero motor speeds.

The high starting torque and variable speed characteristics of a series connected direct current motor make it ideally suited for service in crane drives, hoist drives, elevator drives, and electric locomotives and trolleys where the loads are heavy at the start and then become lighter once the load is in motion. In each of these applications, accurate, continuous control of the operation of the motor is essential. Further, the motor may be subjected to overhauling loads, that is, loads which may tend to drive the motor faster than the motor is driving the load. Also, safety considerations in the operation of the motor are paramount.

The foregoing factors point to the necessity of providing a satisfactory braking means to the motor so as to lend accuracy to the operation of the motor, permit operation with overhauling loads, and provide a safe, rapid means for reducing the speed of, or stopping, the motor.

Many methods have evolved for providing braking to the series motors used in crane service and similar applications. A simple mechanical brake on the motor output shaft is sometimes employed. While such a device is inexpensive, its braking action is difficult to control. Maintenance of the mechanical brake also raises problems. The use of an external electro-mechanical brake, such as an eddy current brake, solves some of the foregoing problems but, on the whole, external brakes have generally proven unsatisfactory.

A direct current motor may also be braked by adjusting the energization of the armature and field of the motor. One such method is termed "plugging" and involves reversing the motor armature voltage and current when it is desired to brake the motor. While the reduction in speed is rapid and the electrical apparatus required is little and inexpensive, the high circulating current in the armature circuit places a large thermal strain on the motor. Repeated braking operations cannot be performed without excessive heating and damage to the motor.

In dynamic braking of a direct current series motor, a resistor is placed in the armature circuit and the field is excited with a separate source. The motor, in effect, becomes a direct current generator supplying power to the resistor load. While a resistor limits the armature current and hence the thermal strain on the motor, it also decreases the effectiveness of the braking action, particularly at low speeds. Further, switching and excitation means must be provided for the motor field.

Regenerative braking of direct current motors also employ the motor as the generator similar to dynamic braking. However, the vital difference is that in regenerative braking the power generated by the motor is applied back to the active power source for the motor rather than being circulated through the passive resistor load. Reduced to its essence, power may be regenerated or supplied back to the active power source for the motor by reversing the polarity of the armature voltage while maintaining armature current flow in the same direction or by reversing armature current flow while maintaining the polarity of the armature voltage. In either case, the motor that was formerly a load becomes a power source. The advantages of such a system include the fact that braking may be done on a permanent basis, whereas plugging and dynamic braking are normally utilized only in transient conditions or for isolated stops. Also, with proper control, the armature current may be limited, thereby eliminating the excessive motor heating experienced in other methods of braking. Braking may also be accomplished very rapidly. Regenerative motor controls are shown in U.S. Patent 3,435,316, Ser. No. 499,-409, filed Oct. 21, 1965, by the same inventor.

For the foregoing reasons, regenerative braking is generally considered to be the most desirable method of braking direct current motors. However, the application of this method requires a complex power source to reverse either the armature voltage or the armature current without reversing the other quantity. Further, regenerative operation of a series connected DC motor has often been considered impractical in the past because of the unstable conditions and electrical phenomena heretofore developed in the motor during regenerative braking and the switching from motoring operation to braking operation. The switching from motoring operation to braking operation required a relatively long switching interval during which the motor was neither motoring or regenerating. During this "dead time" the motor was essentially uncontrolled and accurate control of the motor was rendered extremely difficult. As the motor armature and motor field are connected in series in a series motor, the switchgear or other electromechanical apparatus used in the control had to be rated to handle full armature current, thereby making it expensive and bulky.

It is, therefore, a primary object of the present invention to provide a regenerative direct current motor control which energizes the motor so that the armature current and the field current are proportional to each other, thereby to cause the motor to exhibit the operational characteristics of a series connected direct current motor, and which provides regenerative braking to the motor.

Another object of the present invention is to provide a regenerative direct current motor control which provides control to the motor over a wide range of operating conditions.

Yet another object of the present invention is to provide a regenerative direct current motor control which rapidly changes from the motoring state to the braking state and vice versa thereby to reduce to a minimum the time during which the motor is neither motoring or regenerating.

A further object of the present invention is to provide a regenerative direct current motor control which operates with complete stability in both the motoring and operating states and during the transition between the two states.

A still further object of the present invention is to provide a regenerative direct current motor control which utilizes electronic means rather than electro-mechanical means to control the motor to thereby provide a control which is simple, inexpensive and compact in construction and which provides reliable operation of substantial periods of time.

Another object of the present invention is to provide a regenerative directive current motor control which energizes the motor so as to cause it to exihibit the operational characteristics of a series connected direct current motor and which permits the direction of rotation of the motor to be reversed without the necessity of employing expensive, bulky electro-mechanical switching means to reverse the motor field.

Other objects and advantages of the present invention will become apparent from the following specification and drawings forming a part thereof in which:

FIGURE 1 is a schematic diagram of one embodiment of the regenerative direct current motor control of the present invention;

FIGURE 2 is a schematic diagram of another embodiment of the regenerative direct current motor control of the present invention; and FIGURE 3 is a schematic diagram of a circuit employed in the control of FIGURE 1.

Referring now to the figures and particularly to FIGURE 1, there is shown therein a static regenerative direct current motor control constructed in accordance with the present invention. Control 10 includes reference and feedback circuit 14, operational amplifier 16, field circuit 18, and armature circuit 20. The control drives a direct current motor 22 having an armature 24 and a motor field 26 each of which includes or comprises an electro-magnetic coil or winding. The control is provided with input power from multiphase AC lines 28. While multiphase AC lines are shown in FIGURES 1 and 2, it will be appreciated that single phase AC may be used if desired.

Reference and feedback circuit 14 includes a reference signal source 30 providing a variable DC signal to conductor 32 by means of DC supply 33 and potentiometer 31. A feedback signal is provided by tachometer 34 which is connected to armature 24 and supplies a DC signal corresponding to the speed of armature 24 to conductor 36. Feedback signals corresponding to other operative conditions in the motor, such as torque, or operational conditions in the apparatus driven by the direct current motor, as for example web tension may be used. Hence, the control of the present invention is not to be construed solely as a motor speed control. Conductors 32 and 36 are joined at mixing junction 38 which provides an error signal to conductor 40. This error signal may be of either polarity and serves as a motoring control signal in one polarity and a regenerative braking control signal in the other polarity.

The error signal in conductor 40 is fed to operational amplifier 16. Amplifier 16, which is of the high gain type, has two output signals having abrupt saturation points. Both of the signals are proportional in magnitude to the input signal. However, the polarity of one output signal is the same as the polarity of the input error signal from conductor 40 and is termed the direct output signal, while the other output signal is of the opposite polarity from the input error signal in conductor 40 and is termed the inverse output signal. One of these output signals is used to control both field circuit 18 and armature circuit 20 while the other is used to control only armature circuit 20. While FIGURE 1 shows the inverse output signal of operational amplifier 16 as being supplied to both field circuit 18 and armature circuit 20 and the direct output signal of operational amplifier 16 as supplied to armature circuit 20 only, the connection of these output signals may be reversed and the invention is not to be interpreted as limited to the connection shown in FIGURE 1. A typical circuit which may be employed as operational amplifier 16 is shown on page 119 of the Transistor Manual, published by the General Electric Company, Seventh Edition, 1964.

Field circuit 18 includes motor field 26. The field circuit is supplied with alternating current from AC supply lines 28 through transformer 42. The output of transformer 42 contains two groups of oppositely connected rectifiers 44 and 46 and 48 and 50. These rectifiers control the direction of current flow through motor field 26, one group of rectifiers being energized for each direction of current flow. A field controlled rectifier firing circuit 52, which may be considered a push-pull proportional amplifier, controls the operation of controlled rectifiers 44 through 50 in response to the inverse output signal from operational amplifier 16 provided by conductor 41. The control provided by field controlled rectifier firing circuit 52 determines which group of controlled rectifiers will be placed in the conductive state and the magnitude of the field current. A typical circuit which may be employed as field controlled rectifier firing circuit 52 is shown on page 59 of the SCR Manual, published by the General Electric Company, Second edition, 1961.

Field circuit 18 also contains a resistive network comprising resistors 54 and 56. These resistors act as a limiting impedance to prevent short circuits in the motor field power circuit in the event of faulty firing of one of the controlled rectifiers and, as a secondary function, reduce the time constant of motor field 26. Resistors 58 and 59 provide a means of sensing the polarity and magnitude of the current in motor field 26. Resistor 58 provides a negative feedback signal through conductor 43, corresponding to the magnitude of the current in the motor field, to the input of field controlled rectifier firing circuit 52 to cause the magnitude of the motor current to correspond to the ouput signal in conductor 41 from operational amplifier 16, as hereinafter described.

Armature circuit 20 is supplied with power from alternating current supply lines 28 through transformer 60. The amount of power provided to motor armature 24 is controlled by armature controlled rectifier bridge 62 containing controlled rectifiers 146 through 151. Bridge terminals 306 and 307 constitute the output terminals of control 10.

Armature controlled rectifier firing circuit 64 controls the operation of the rectifiers in armature controlled rectifier bridge 62. In order that the control may provide regenerative operation, armature contolled rectifier firing circuit 64 must be capable of controlling the operation of the controlled rectifiers through one entire half cycle of the alternating current from supply lines 28 and through a portion of the other half cycle. Such a firing circuit may be provided by altering the phase relationship of the synchronizing voltages to the circuit shown on page 132 of the aforementioned SCR Manual to permit the circuit to operate for the portion of the other half cycle.

Current regulating and regenerative logic circuit 66 performs a dual function. The regenerative logic portion 661 thereof determines whether a combination of conditions in the control are proper for regenerative operation or motoring operation and operates armature circuit 20 accordingly. In making such a determination the logic circuit utilizes field polarity signals supplied by resistors 58 and 59 through conductors 68 and 69 as well as the direct and inverse output signals from operational amplifier 16 supplied through conductors 71 and 73. Regenerative logic portion 661 may utilize a pair of AND gates 198 and 199 which receive signals from operational amplifier 16 and resistors 58 and 59. Specifically, AND gate 198 utilizes the direct output signal of operational amplifier 16 in conductor 71 and the field current polarity signal in conductor 68. AND gate 199 utilizes the inverse output signal of operational amplifier 16 in conductor 73 and the field current polarity signal in conductor 69. AND gate 198 opens during motoring to provide a controlling signal to armature controlled rectifier firing circuit 64 while AND gate 199 opens during regenerative operation to provide a controlling signal to the armature controlled rectifier firing circuit.

A typical circuit which may be employed as AND gates 198 and 199 is shown in FIGURE 3. This gate, which for purposes of illustration will be described as AND gate 198, is comprised of two transistors 203 and 205. Transistor 203 is connected in emitter follower configuration. Specifically, the collector terminal of transistor 203 is connected to the positive supply voltage in conductor 207. The emitter is connected through resistor 209 to output terminal 211 and to the collector terminal of transistor 205. The emitter of transistor 205 is connected to the negative supply voltage in conductor 213. The input signals to AND gate 198 are provided to the base terminals of transistors 203 and 205. For example, the direct output signal from operational amplifier 16 in conductor 71 may be connected to the base terminal of transistor 203 while the field current polarity signal in conductor 68 is connected to the base terminal of transistor 205.

Under conditions of motoring operation the direct output signal of operational amplifier 16 in conductor 71 will be of positive polarity and will turn transistor 203 on, allowing current to flow through its emitter-collector circuit. The magnitude of the emitter collector current in transistor 203 will be proportional to the magnitude of the signal in conductor 71. The field current polarity signal in conductor 68 will be negative in polarity and will turn transistor 205 off. As transistor 205 is non-conducting, the emitter-collector current in transistor 203 will appear at output terminal 211 to provide a signal to the remainder of current regulating and regenerative logic circuit 66 to regulate the armature energization during motoring. The above described combination of signals is said to open AND gate 198.

If the polarity of the direct output signal of operational amplifier 16 in conductor 71 changes to negative, transistor 203 will be turned off and no signal will appear at output terminal 211. Also, even if transistor 203 is on, if a signal of positive polarity appears in conductor 68, connected to the base terminal of transistor 205, that transistor will be turned on and will pass any emitter-collector current in transistor 203 directly to conductor 213. This will prevent an output signal from appearing at output terminal 211. These latter signals may be applied to the base terminals of transistors 203 and 205 during regeneration operation of control 10 or during the switching between motoring and regenerative operation and are said to close AND gate 198 and prevent a signal from being supplied to the remainder of armature circuit 20.

AND gate 199 operates in an analogous but opposite manner to provide a control signal to armature circuit 20 under regenerative conditions.

The current regulating portion 662 of circuit 66 includes amplifier 201 which regulates the armature current during motoring and regenerative operation and utilizes the output signals from AND gates 198 and 199 as the reference signal and an armature current feedback signal in conductor 70 as the feedback signal.

The armature circuit 20 of control 10 utilizes two operational loops. These may be termed the inner loop and the outer loop to indicate that the former operates within the confines of the latter. The outer operational loop is utilized to control motor speed and comprises tachometer 34, operational amplifier 16, regenerative logic and current regulating circuits 66, armature controlled rectifier firing circuit 64, armature controlled rectifier bridge 62, and amature 24. The outer loop controls the operation of control 10 as long as operational amplifier 16 is unsaturated. When operational amplifier 16 saturates, the above described outer loop becomes inoperative since further error signal changes in conductor 40 are not transmitter through operational amplifier 16. For normal speed regulating operation, however, the operational amplifier of the outer loop is not saturated and the inner loop serves as an active part of the outer loop.

The inner operational loop is used to regulate armature current at all times in accordance with the amplifier error signal from amplifier 16 thereby to lend stability to the operation of control 10. It comprises conductor 70 containing the armature current feedback signal, current regulating amplifier 201, armature controlled rectifier firing circuit 64, armature controlled rectifier bridge 62, and armature 24. The inner loop is a complete feedback regulator employing as a reference signal one of the outputs of amplifier 16 as selected by the logic portion 661 of logic and current regulating circuit 66, and as a feedback signal, the armature current signal in conductor 70. This inner loop is operative throughout all operational sequences of control 10. The gain and response of this inner loop regulator is sufficient to cause armature current to accurately and rapidly follow the signal from amplifier 16, thereby causing the magnitude of armature current to be proportional to the error signal in conductor 40. However, when the error signal becomes large enough to saturate the outputs of amplifier 16, further increases in error signal can no longer cause an increase in armature current since the reference signal to the inner current loop regulator cannot be larger than the satuated output of amplifier 16. In this manner the maximum armature current is sharply limited to a value corresponding to the saturated output of amplifier 16. As the output of amplifier 16 may change almost instantly from a low level to its highest level, the nature of response of the inner current loop regulator to an instantaneous rise in reference signal must include a complete lack of overshoot to prevent transient currents from being larger than the maximum desired value. This may be accomplished by proper selection of circuit constants.

As previously noted, the field current is also regulated to a value corresponding to the output of operational amplifier 16 by the action of field controlled rectifier firing circuit 52. This circuit receives an output signal from operational amplifier 16 via conductor 41 and the feedback signal in conductor 43 corresponding to the field current. These signals operate firing circuit 52 in the manner of a regulator to cause the field current to correspond to the output of amplifier 16. When the output of amplifier 16 satrates, the field current is limited to a value proportional to the magnitude of the saturated output. The field current therefore remains proportional to the armature current under these conditions, also.

As both the armature current in armature 24 and the field current in motor field 26 are proportional to the output of amplifier 16, they are therefore proportional to each other, and motor 22 will have the same operational characteristics as a series connected direct current motor in which the armature current and the field current are proportional.

Regenerative direct current motor control 10 regenerates or supplies power back to the active power source for the motor by reversing the polarity of the armature voltage while maintaining armature current flow in the same direction. Armature 24 generates a counter e.m.f. while rotating in the motoring state. The controlled rectifiers 146 through 151 in armature rectifier bridge 62 may conduct power to armature 24 anytime the applied voltage from the alternating current supply lines 28 is more positive than the counter e.m.f. generated by armature 24, since the anodes of the controlled rectifiers 146, 148, and 150 in the rectifier bridge 62 may be considered connected to the AC supply lines 28 while the cathodes of the rectifiers are connected to the counter e.m.f. of armature 24. The amount of power supplied to armature 24 and the speed of motor 22 during motoring operation is determined by the fraction of the time during which the applied voltage is more positive than the counter e.m.f. that the rectifiers of rectifier bridge 62 are rendered conductive. The larger the portion of this time the rectifiers are rendered conductive, the greater the supplied power.

During regenerative operation, the energization of motor field 26 is reversed, reversing the polarity of the counter e.m.f. of motor 22. This will provide a greater time interval during which the counter e.m.f. of motor 22 is more negative than the applied voltage. During a portion of this time interval, the voltage on the anode of the controlled rectifiers 146, 148, and 150 in bridge 62, that is, the AC supplied by alternating current supply lines 28, has a negative polarity with reference to the alternating current source. When the anodes of these controlled rectifiers in bridge 62 are more positive than the cathodes thereof, even though they are negative with reference to the AC source, the controlled rectifiers may conduct current in the same direction through armature rectifier bridge 62 if a firing signal is provided from armature controlled rectifier firing circuit 64. This current will flow from armature 24 through the controlled rectifiers of armature bridge 62 and transformer 60 in a regenerative fashion to AC supply lines 28 due to the fact that the polarity of the supply voltage on bridge 62 has reversed while the direction of current flow therethrough remains the same. Thus, armature controlled rectifier firing circuit 64 must be capable of firing during the part of the cycle when the applied voltage from AC supply lines 28 is positive as during motoring operation, and also during that part of the cycle when the alternating current supply voltage is negative with reference to the alternating current source but less negative than the counter e.m.f. as during regenerative operation.

To operate control 10, switch 72 is closed to energize the circuitry of the control. Reference signal source 30 is adjusted to provide a signal corresponding to desired speed. The signal is supplied through conductor 32 to junction 38 and thence to operational amplifier 16. Operational amplifier 16 produces a direct output signal and an inverse output signal proportional to the input signal in conductor 40. As armature 24 is not yet rotating, there will be no feedback signal supplied by tachometer 34.

Field circuit 18 utilizes one of the output signals from operational amplifier 16 to turn on either rectifiers 44 and 46 or rectifiers 48 and 50 by means of field controlled rectifier firing circuit 52. The desired direction of rotation of motor 22 is determined by which group of controlled rectifiers is turned on. For example, rectifiers 48 and 50 may be turned on. When motor field 26 is energized, field controlled rectifier firing circuit 52 will receive a feedback signal through conductor 43 which will regulate the output of firing circuit 52 so that the field current corresponds to the output of operational amplifier conained in conductor 41.

Both the inverse output signal and the direct output signal of operational amplifier 16 are supplied to regenerative logic and current regulating circuit 66 via conductors 71 and 73, respectively. This circuit determines whether conditions in control 10 are proper for motoring or regenerative operation by means of the polarity of the output signals of operational amplifier 16 and the motor field polarity signals in conductors 68 and 69. These signals operate AND gates 198 and 199 in the logic portion of circuit 66 and operate the armature circuit accordingly. For the present motor operation, AND gate 198 is opened by the direct output signal of amplifier 16 in conductor 71 and the current signal in conductor 68 and passes an output signal proportional to the direct output signal of amplifier 16 to current regulating amplifier 201 of the inner current regulating loop. The output of amplifier 201 is supplied to armature controlled rectifier firing circuit 64. Armature controlled rectifier firing circuit 64 provides a firing signal to the controlled rectifiers of armature controlled rectifier bridge 62 to energize armature 24 and accelerate the armature.

Acceleration of armature 24 causes tachometer 34 to generate a feedback signal in conductor 36 which reduces the magnitude of the error signal in conductor 40. This likewise reduces the magnitude of both outputs of operational amplifier 16 and cases armature controlled rectifier firing circuit 64 to retard the firing angle of the controlled rectifiers in armature controlled rectifier bridge 62 to reduce the armature current and field controlled rectifier firing circuit 52 to retard the firing angle of controlled rectifiers 48 and 50 to reduce the field current to maintain its proportionality to the armature current.

Control 10 continues to operate in this manner to regulate the operation of motor 22. As previously noted, the operation of motor 22 will resemble that of a series connected direct current motor because of the proportionality maintained between the armature current and the field current due to the feedback signals in control 10.

The regenerative operation of control 10 may be brought on by reducing the reference signal in conductor 32 or providing an overhauling load to armature 24. In either case, the feedback signal generated by tachometer 34 in conductor 36 exceeds the reference signal generated by reference signal source 30 in conductor 32. This reverses the polarity of the error signal in conductor 40 and hence the polarity of the inverse output signal and the direct output signal from operational amplifier 16. Because of the high gain of operational amplifier 16, a small reversal in the polarity of the error signal is sufficient to initiate regenerative operation. The reversed polarity of the output signal from operational amplifier 16 to field controlled rectifier firing circuit 52 causes the latter circuit to energize controlled rectifiers 44 and 46 and deenergize controlled rectifiers 48 and 50 in field circuit 18 to reverse the energization of motor field 26. The reversal of motor field 26 reverses the counter e.m.f. of armature 24 and the polarity of the signals in conductors 68 and 69.

Operational amplifier 16 provides output signals of reverse polarity to the regenerative logic portion of current regulating and regenerative logic circuit 66. This closes AND gate 198 and prevents a signal from issuing to armature control rectifier firing circuit 64 during a period of switching between motor and regenerative operation. The reversed signals in conductors 68 and 69 indicating that motor field 26 has completed its reversal opens AND gate 199 by action of the inverse output signal of operational amplifier 16 in conductor 73 and the field polarity signal in conductor 69. AND gate 199 provides a signal to current regulating amplifier 201 and to armature controlled rectifier firing circuit which regulates the operation of the rectifiers in armature controlled rectifier bridge 62 so as to regenerate power to AC supply lines 28 in the previously described manner.

It may be noted that under conditions wherein motor 22 is lightly loaded, where the operation of control 10 may tend to switch from motoring to regenerative operation, as described above, in a somewhat random fashion, the motor field 26 will be weakly energized to maintain its proportionality to the armature current. As the field is weakly energized, reversal of the current flow through the motor field may be accomplished rapidly as the field switches from weak energization in one polarity to weak energization in the other polarity. This contrasts to a prior art regenerative direct current motor controls where the field was generally energized full on in both directions and required a considerable period of time to fall to zero from full energization in one direction and rise from zero to full energization in the other direction. As accurate control cannot be maintained during this period, these prior art controls suffered from a slow speed of response to conditions requiring a switching from motoring to regenerative operation and vice versa.

Further, all switching occurring in field circuit 18 is conducted by controlled rectifiers 44 through 50 rather than electro-mechanical switchgear such as was often formerly used to switch and control the motor current. In addition to being more rapid, the former also is less expensive, smaller, and more reliable than the latter.

If the error signal in conductor 40 is excessively large during either motor or regenerative operation, the operational amplifier 16 becomes saturated and control over armature circuit conditions is delegated to the inner current regulating loop. Current regulating amplifier 201 limits the output signal to armature controlled rectifier firing circuit 64 by comparing the current feedback signal in conductor 70 with a reference signal comprised of the saturated output of operational amplifier 16 to retard the firing angle of the controlled rectifiers in armature controlled rectifier bridge 62 and to retain the armature current at the maximum desired value.

It will be appreciated that if it is desired to limit the armature current to a different value during motoring operation than during regenerative operation because of the particular use to which the control is put or for other reasons, the output signals of operational amplifier 16 may be altered during either motoring or regenerative operation so that they are opposite in polarity but unequal in magnitude at saturation. Different values of armature current limit will therefore be established depending on which output signal from operational amplifier 16 is used as the reference signal to current regulating amplifier 201.

If the desired to reverse the direction of rotation of motor 22, it is necessary only to reverse the polarity of the reference signal in conductor 32. This immediately reverses the error signal in conductor 40 and causes field controlled rectifier firing circuit rectifier controlled rectifier firing circuit 52 to turn on either controlled rectifiers 44 and 46 or controlled rectifiers 48 and 50 to reverse the field current. The motor 22 is regeneratively braked to zero speed, in the manner described above, and is then accelerated in the opposite direction until the feedback signal generated by tachometer 34 in conductor 36 approaches the reversed reference signal in conductor 32. The operation of control 10 in the reversed direction of rotation is identical to the operation of the control in the forward direction. It will be noted that reversal of the field current is obtained without the use of electro-mechanism switchgear formerly required.

FIGURE 2 shows another embodiment, 10A, of the present invention. Similar numbers identify elements corresponding to those found in control 10 shown in FIGURE 1. In the embodiment of FIGURE 2, the regenerative logic portion 661 of current limit and regenerative logic circuit 66 has been eliminated, leaving only current regulating amplifier 201. The inputs to this amplifier comprise the armature current feedback signal in conductor 70 and a field current feedback signal in conductor 68. This latter signal acts as the reference signal to amplifier 201. In this embodiment, amplifier 201 operates from the magnitude of the field current signal rather than the polarity of the signal and hence, the signal in conductor 68 is passed through rectifier 75 to render it unipolar. Operational amplifier 16 need have only one output signal, that is, the output signal in conductor 41 necessary to operate field controlled rectifier firing circuit 52 in field circuit 18. The remainder of control 10A is constructed in the same manner as control 10.

In the operation of control 10A, the operation of field circuit 18 is identical to that described in connection with control 10. In the operation of the armture circuit 20, a field current signal in conductor 68 becomes the reference signal to current regulating amplifier 201 and the inner current regulating loop. This signal regulates the armature current to a value proportional to the field current by means of the signal in conductor 68 and the armature current feedback signal in conductor 70, thereby providing the desired proportionality between the armature current and the field current to cause motor 22 to operate with series connected direct current motor characteristics.

As the armature current automatically follows the field current, when control 10A undergoes regenerative operation and the field current decreases to zero in preparation for reversal, the armature current will likewise diminish to zero. When the field is reapplied in the reversed or regenerative direction, the armature current will likewise be reapplied to the armature circuit. This operation eliminates the AND gates 198 and 199 shown in FIGURE 1.

Further to control 10A shown in FIGURE 2, if the high gain provided by operational amplifier 16 is not required by the application to which motor 22 is put, the error signal from junction 38 in conductor 40 may be fed directly to field controlled rectifier firing circuit 52. Amplifier 16 may therefore be eliminated as shown by the dotted lines in FIGURE 2. As this firing circuit is an amplifier itself, it may serve the function of the separate operational amplifier 16. Attainment of full field strength performs the armature current limiting function formerly performed by the saturated output signals of amplifier 16.

In control 10A of FIGURE 2 it is not necessary that the negative feedback field current signal in conductor 43 be supplied to field controlled firing circuit 52 in order to maintain the proportional current energization of field circuit 18 and armature circuit 20. Firing circuit 52, being a proportional amplifier, provides current energization to the motor field 26 in accordance with the magnitude of its input signal, that is, in accordance with the magitude of the error signal in conductor 40. The signal corresponding to field current in conductor 68 forms the reference signal to current regulating amplifier 201 which provides proportionate current energization to armature 24 thereby maintaining series motor characteristics. An operative condition feedback signal is provided to all of control 10A by tachometer 34.

Although the arrangements described herein are at present considered to be preferred, it is understood that variations and modifications may be made therein without departing from the scope of the invention. Specifically, it is appreciated that other circuit elements than those described, either in the specification or the references cited therein, may be employed in the control of the present invention. It is intended to cover in the appended claims all such variations and modifications as fall within the true spirit and scope of the invention.

I claim:

1. A regenerative, direct current motor control for providing the field and armature windings of a direct current motor with proportionate current energization in accordance with the magnitude of a bipolarity operative condition error signal produced by a motor operative condition error signal source and for braking the motor by regenerating power from the armature winding to an alternating current power supply in accordance with the polarity of the error signal, said control comprising:

a field circuit means having an output connected to the field winding, said field circuit means being operable by the error signal and responsive to the magnitude and the polarity thereof for providing energizing current to the field winding of the motor proportional in magnitude to the magnitude of the error signal and for reversing the direction of current flow through the motor field winding when the polarity of the error signal changes, thereby rendering the control capable of regenerative operation;

signal means connected to said field circuit means for providing an output signal proportional in magnitude to the magnitude of the motor field winding current at least during the time the field winding is energized by said field circuit means; and an armature circuit means interposed between the motor armature winding and the alternating current power supply, said armature circuit means having an input receiving said output signal and being responsive to the magnitude of said signal for providing unidirectional current energization between the armature winding and the power supply proportional in magnitude to the magnitude of said output signal and the field winding current, said armature circuit means providing, for any given motor rotary direction, motoring operation to said motor for one direction of field current flow and regeneration of power from the armature winding to the power supply for the other direction of the field current flow.

2. The regenerative, direct current motor control of claim 1 wherein said signal means comprises conductor means connected to the motor field winding for providing an output signal proportional in magnitude to the magnitude of the motor field winding current to the armature circuit means.

3. The regenerative, direct current motor control of claim 2 including a device, interposed in said conductor means, for rendering said output signal proportional in magnitude to the magnitude of the field current regardless of the direction of the current flow though the motor field winding.

4. The regenerative, direct current motor control of claim 1 wherein said field circuit means has an input and said signal means comprises:

a signal generator interposed at the input of said field circuit means for receiving the error signal to the control, said signal generator producing a direct output signal directly proportional in magnitude and corresponding in polarity to the error signal and an inverse output signal proportional in magnitude but inverse in polarity with respect to the error signal, said signal generator providing an output signal to the input of said field circuit means;

means connected to the field winding for providing a signal indicating the direction of motor field winding current flow; and a logic means having an input connected to said signal generator and to said means connected to the field winding, said logic means having an output connected to said armature circuit means, said logic means being operable by said field current direction signal for providing one of the output signals of said signal generator to said armature circuit means as the signal proportional in magnitude to the magnitude of the motor field winding current for one direction of field winding current flow and for providing the other of the output signals of said signal generator to said armature circuit means as the signal proportional in magnitude to the magnitude of the motor field current for the other direction of field winding current flow.

5. The regenerative, direct current motor control of claim 1 wherein said field circuit means includes an amplifier having an output connected to the field winding for controlling the magnitude of the field winding current, and further includes a means for generating a negative feedback signal proportional in magnitude to the magnitude of the motor field winding current and for suppling said feedback signal to said field circuit amplifier, said amplifier having an input receiving said error signal and said negative feedback signal and being responsive to said signals for causing said amplifier to provide energizing current to the motor field winding proportional in magnitude to the magnitude of the error signal.

6. The regenerative, direct current motor control of claim 1 wherein said field circuit means includes electronic means for reversing the direction of current flow through said motor field winding.

7. The regenerative, direct current motor control of claim 1 wherein said armature circuit means includes an armature current regulating circuit having an input receiving said output signal and a means providing an armature current feedback signal to the input of said armature current regulating circuit in electrical opposition to said output signal, said armature current regulating circuit being responsive to said signals for providing current energization to the motor armature winding proportional to the output signal at all times so that when the field current signal reaches full strength, the armature current is limited to a corresponding value.

8. The regenerative, direct current motor control of claim 4 wherein said armature circuit means includes an armature current regulating circuit having an input receiving said signal from said logic means and a means providing an armature current feedback signal to the input of said armature current regulating circuit in electrical opposition to said logic means signal, said armature current regulating circuit being responsive to said signals for providing current energization to the motor armature winding proportional to the logic means signal.

9. The regenerative, direct current motor control of claim 8 wherein said operative condition error signal source is in the control and operatively associated with the motor armature for generating an error signal corresponding to the error between desired conditions and actual conditions in the motor, said error signal source, said signal generator, said logic means, said armature circuit means, and the motor armature, forming an operational control means to regulate the operative condition of said motor, said current regulating circuit, said means providing an armature current feedback signal, and the motor armature forming an operational control means operating within said outer operational control means throughout all operation sequences of said control for regulating the armature current.

References Cited

UNITED STATES PATENTS 2,783,427  2/1957  Bracutt _____ 318—338

FOREIGN PATENTS 687,000  3/1965  Italy.

ORIS L. RADER, Primary Examiner

K. L. CROSSON, Assistant Examiner

U.S. Cl. X.R.

318—269, 293, 302, 338